United States Patent
Chatterjee et al.

(10) Patent No.: US 9,961,491 B1
(45) Date of Patent: May 1, 2018

(54) GENERATING GEOFENCES

(71) Applicant: Square, Inc., San Francisco, CA (US)

(72) Inventors: Shuvo Chatterjee, San Francisco, CA (US); William Henderson, San Franscisco, CA (US); Nathan Spindel, San Francisco, CA (US); Scott Charles Perry, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days. days.

(21) Appl. No.: 15/040,618

(22) Filed: Feb. 10, 2016

Related U.S. Application Data

(62) Division of application No. 14/040,328, filed on Sep. 27, 2013, now Pat. No. 9,351,114.

(60) Provisional application No. 61/858,553, filed on Jul. 25, 2013.

(51) Int. Cl.
*H04W 4/02* (2009.01)
*G06Q 30/06* (2012.01)
*G06Q 20/32* (2012.01)

(52) U.S. Cl.
CPC .......... *H04W 4/021* (2013.01); *G06Q 20/322* (2013.01); *G06Q 30/0639* (2013.01)

(58) Field of Classification Search
CPC .. H04W 4/021; G06Q 20/322; G06Q 30/0639
See application file for complete search history.

(56) References Cited

U.S. PATENT DOCUMENTS

| 8,965,406 B2 | 2/2015 | Henderson |
| 2005/0153725 A1 | 7/2005 | Naghian et al. |
| 2005/0159883 A1 | 7/2005 | Humphries et al. |
| 2007/0143013 A1 | 6/2007 | Breen |
| 2008/0162034 A1 | 7/2008 | Breen |
| 2009/0164118 A1 | 6/2009 | Breen |
| 2009/0286549 A1 | 11/2009 | Canon et al. |
| 2009/0312032 A1 | 12/2009 | Bornstein et al. |
| 2010/0042940 A1* | 2/2010 | Monday ................ G06F 3/0486 715/764 |
| 2011/0148626 A1 | 6/2011 | Acevedo |

(Continued)

FOREIGN PATENT DOCUMENTS

| CA | 2 883 921 A1 | 3/2014 |
| WO | 2010/080938 A2 | 7/2010 |
| WO | 2012/000107 A1 | 1/2012 |
| WO | 2013/058954 A1 | 4/2013 |
| WO | 2014/039672 A2 | 3/2014 |
| WO | 2015/013099 A2 | 1/2015 |

OTHER PUBLICATIONS

Buczkowski, A., "Location-Based Marketing the Academic Framework," Masters Program in Geospatial Technologies, pp. 1-77 (Feb. 2012).

(Continued)

*Primary Examiner* — Qun Shen
(74) *Attorney, Agent, or Firm* — Polsinelli PC

(57) ABSTRACT

Methods, systems, and apparatus, including computer programs encoded on computer storage media, for generating geofences. One of the methods includes receiving, at a mobile device, a signal emitted by a merchant device associated with a merchant. If the signal is emitted by a merchant device associated with a merchant and the distance between the mobile device and the merchant device satisfies a threshold, a notification is provided on the mobile device indicating proximity of the merchant associated with the merchant device.

18 Claims, 17 Drawing Sheets

(56) References Cited

U.S. PATENT DOCUMENTS

| | | |
|---|---|---|
| 2011/0178811 A1 | 7/2011 | Sheridan |
| 2011/0250875 A1 | 10/2011 | Huang et al. |
| 2011/0250901 A1 | 10/2011 | Grainger et al. |
| 2011/0256881 A1* | 10/2011 | Huang ................ G01S 5/0257 455/456.1 |
| 2012/0005026 A1 | 1/2012 | Khan et al. |
| 2012/0008526 A1* | 1/2012 | Borghei ................ H04W 4/021 370/254 |
| 2012/0078799 A1 | 3/2012 | Jackson et al. |
| 2012/0172027 A1 | 7/2012 | Partheesh et al. |
| 2012/0214506 A1 | 8/2012 | Skaaksrud et al. |
| 2013/0072226 A1 | 3/2013 | Thramann |
| 2013/0099977 A1 | 4/2013 | Sheshadri et al. |
| 2013/0295970 A1* | 11/2013 | Sheshadri ................ G01S 19/52 455/456.6 |
| 2013/0326137 A1* | 12/2013 | Bilange ............... G06F 12/0866 711/113 |
| 2014/0030982 A1* | 1/2014 | Cardona ................ G01S 5/14 455/67.11 |
| 2014/0057648 A1 | 2/2014 | Lyman et al. |
| 2014/0066090 A1* | 3/2014 | Henderson ............ H04W 4/021 455/456.1 |
| 2014/0164118 A1* | 6/2014 | Polachi .............. G06Q 30/0261 705/14.57 |
| 2014/0337607 A1* | 11/2014 | Peterson ................ G06F 9/4401 713/1 |
| 2015/0031388 A1 | 1/2015 | Chatterjee et al. |

OTHER PUBLICATIONS

Non-Final Office Action dated Dec. 31, 2013, for U.S. Appl. No. 13/605,464, of Henderson, W., filed Sep. 6, 2012.
Notice of Allowance dated Aug. 14, 2014, for U.S. Appl. No. 13/605,464, of Henderson, W., filed Sep. 6, 2012.
Restriction Requirement dated May 4, 2015, for U.S. Appl. No. 14/040,328, of Chatterjee, S., et al., filed Sep. 27, 2013.
Office Action dated Aug. 13, 2015, for Canadian Patent Application No. 2,883,921, of Henderson, W., filed Mar. 3, 2015.
Non-Final Office Action dated Aug. 27, 2015, for U.S. Appl. No. 14/040,328, of Chatterjee, S., et al., filed Sep. 27, 2013.
Notice of Allowance dated Jan. 21, 2016, for U.S. Appl. No. 14/040,328, of Chatterjee, S., et al., filed Sep. 27, 2013.
International Search Report and Written Opinion for PCT Application No. PCT/US2013/058251 dated Dec. 11, 2013.
International Search Report and Written Opinion for PCT Application No. PCT/US2014/047008 dated Nov. 17, 2014.
Notice of Allowance mailed Mar. 4, 2016, for Canadian Patent Application No. 2,883,921, filed Sep. 5, 2013.
Supplementary European Search Report for International Patent Application No. 13835590.4, dated Jul. 7, 2016.
Partial Supplementary European Search Report for European Patent Application No. 14830156.7, dated Feb. 24, 2017.
Intention to Grant for European Patent Application No. 14830156.7, dated Sep. 11, 2017.

* cited by examiner

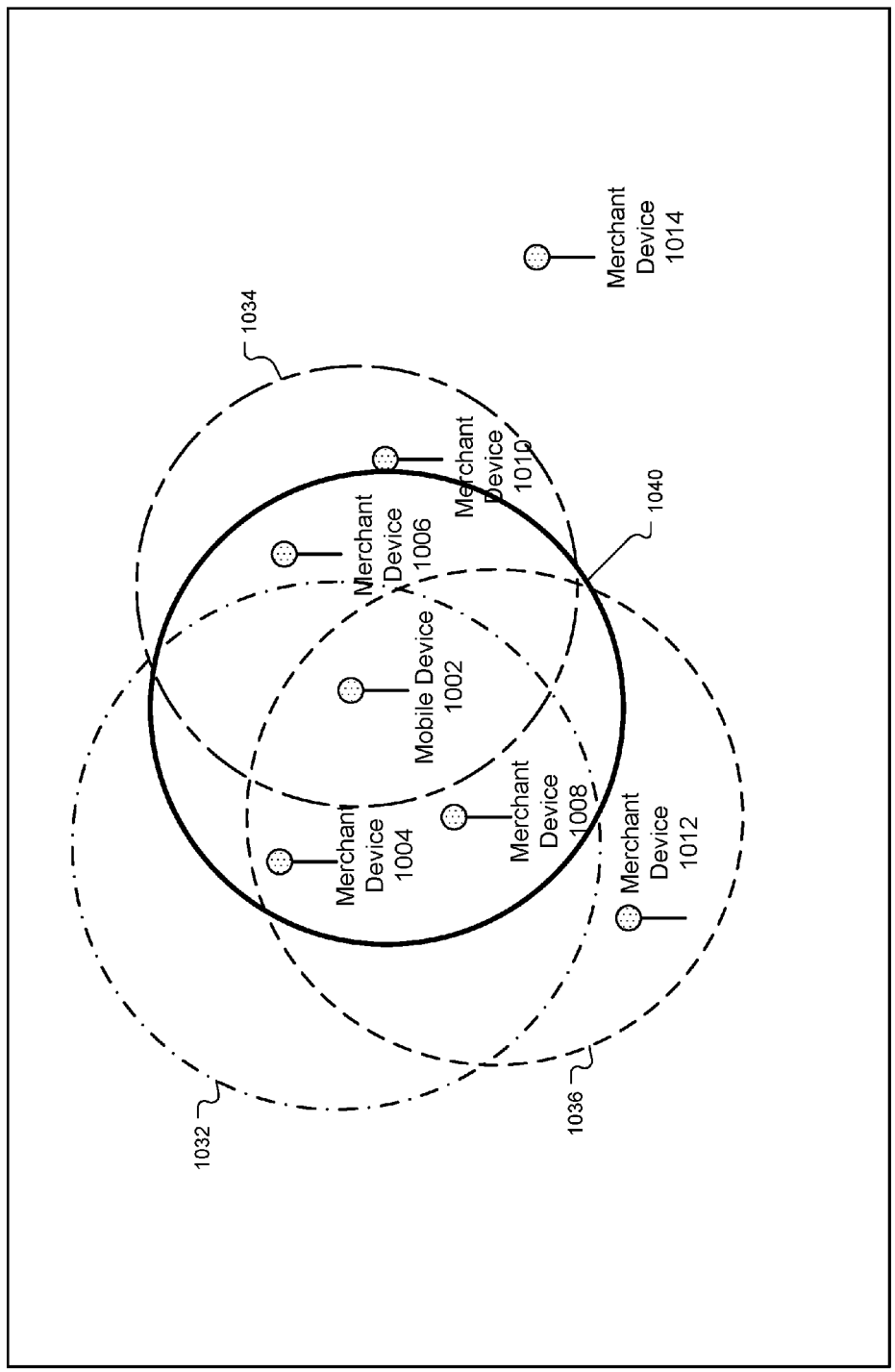

GENERATING GEOFENCES

CROSS-REFERENCE TO RELATED APPLICATIONS

This application claims priority to and is a divisional of U.S. patent application Ser. No. 14/040,328, filed on Sep. 27, 2013 which claims the benefit under 35 U.S.C. § 119(e) of the filing date of U.S. Provisional Patent Application No. 61/858,553, filed on Jul. 25, 2013, entitled "Geofencing Improvements to Core Location," the entirety of which is herein incorporated by reference.

BACKGROUND

A geofence is a virtual perimeter for a real world geographic area. Generally, a geofence can be measured by a radius around a location. A mobile computing device can generate a geofence around a location, for example, a merchant location. The mobile device can detect when the mobile device enters or exits the geofence. The detection can occur as a background process on an operating system of the mobile device. Based on the detection, an application or an operating system of the mobile device can generate a notification.

BRIEF DESCRIPTION OF THE DRAWINGS

FIG. 10A illustrates geofences generated for a dense area.

Like reference numbers and designations in the various drawings indicate like elements.

DETAILED DESCRIPTION

Figure 1:
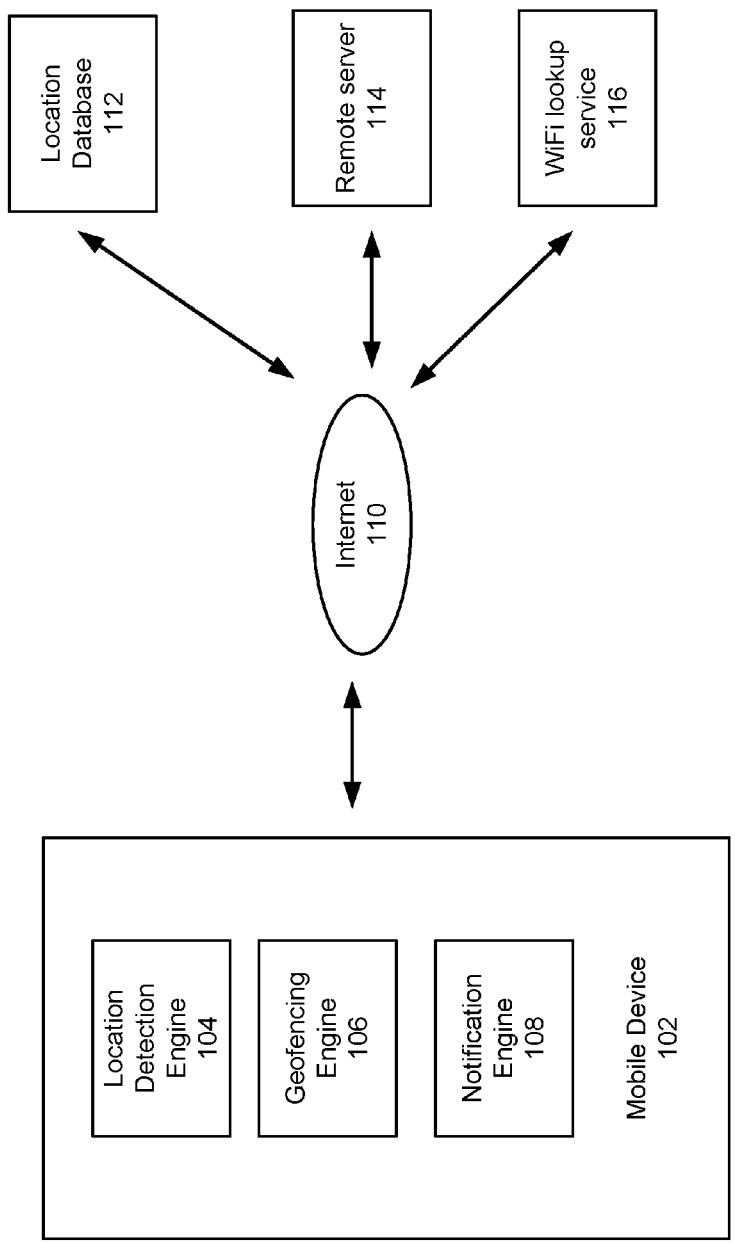
FIG. 1 is a schematic illustration of an example geofence generation system.

FIG. 1 is a schematic illustration of an example geofence generation system 100. The system 100 includes a mobile computing device 102, e.g., a smartphone, a portable media player, or tablet computer. The mobile device 102 includes a location detection engine 104, a geofencing engine 106, and a notification engine 108.

The mobile device 102 can detect its location using the location detection engine 104. The location detection engine 104 can detect the mobile device's current location using WiFi hotspots, cellular tower signals, and/or Global Positioning System (GPS) signals. The location detection engine 104 can run as a foreground or background process to provide the mobile device's location. In some implementations, the location detection engine 104 can be provided by the operating system of the mobile device 102. In some implementations, the location detection engine accesses a remote server 114 to make a call for location information, e.g., the remote server can receive a list of WiFi hotspots from the mobile device and can provide a location based on the list, or the remote server can request a location from a cellular service.

The mobile device 102 can generate geofences using the geofencing engine 106 or the mobile device 102 can receive geofences from a server, e.g., remote server 114. In some implementations, the geofences enclose a circular or elliptical region that includes a location, which may be at or near the center of the region. In some implementations, the geofences enclose polygonal regions that include a location. The geofences can have perimeters that are established by an operating system or an application running on the mobile device 102. For example, a geofence can be established as enclosing a circular region having a radius, e.g., of 100 feet. A merchant location may be at or near the center of the region.

In some implementations, as part of the geofence generation process, the mobile device 102 can store WiFi hotspot identifications associated with a geofence. The mobile device 102 sends a request to a WiFi lookup service 116. The request can include a location around which a geofence should be generated and a radius. The location can be established by the location detection engine or received from a location database 112. The WiFi lookup service 116 can respond with a set of WiFi hotspot identifications based on the location and the radius. In some implementations, the WiFi lookup service 116 also responds with longitude and latitude coordinates of the WiFi identifications. The response is stored by the mobile device 102, and the stored WiFi hotspot identifications are associated with the geofence. Geofences can therefore be represented not only using latitude and longitude coordinates, but also using WiFi hotspot identifications.

The geofence engine 106 can detect whether the mobile device 102 is inside or outside of a generated geofence. In some implementations, the detection is based on the set of WiFi hotspot identifications. The mobile device 102 can identify surrounding WiFi hotspots, e.g., using a WiFi detector, for the mobile device's current location. The mobile device 102 can compare the current WiFi hotspot identifications to the stored WiFi hotspot identifications associated with the geofence. If the mobile device 102 determines that the current WiFi hotspot identifications are equivalent to the stored WiFi hotspot identifications, e.g., using a matching criterion, then the mobile device determines that the it is located outside the geofence, On the other hand, if the mobile device determines that the current WiFi hotspot are equivalent to the stored WiFi hotspot identifications, e.g., using a matching criterion, then the mobile device determines that it is located inside the geofence.

Alternatively, the detection is based on a current location of the mobile device as determined by GPS signals or cellular tower triangulation. For example, the geofence engine 106 can use GPS signals or cellular tower triangulation to obtain longitude and latitude coordinates of the mobile device's current location. The geofence engine 106 can compare the longitude and latitude coordinates to determine whether the mobile device is within the geofence.

Upon detection that the mobile device is inside a geofence, the geofence engine 106 sends an indication to the notification engine 108. The notification engine 108 can provide a notification to an operating system or application running on the mobile device 102. For example, the notification can cause an application to execute an action, e.g., send a third-party request to an external server. In some implementations, the notification is sent to an application associated with a merchant to indicate to a user that the user is proximate to the geographic location of the merchant. For example, the application can rank by distance to the mobile device a number of merchants that are nearby, as determined by associated geofences and display, on the mobile device, the ranking of the nearby merchants. The application can also send the notification to a computer system associated with the merchant, e.g., to send inform the merchant computer system about the proximity of the mobile device to the merchant.

The mobile device 102 can communicate with a location database 112 over a network (e.g., the Internet 110). The location database 112 provides locations that are associated with points of interest (e.g., merchant devices). For example, the location database 112 can receive a request including a mobile device's location. The location database 112 can then respond with one or more merchant locations near the mobile device's location. In some implementations, the locations are represented as longitudes and latitudes. The mobile device 102 can provide the merchant locations to the geofencing engine 106. The geofencing engine 106 can process the merchant locations and generate a geofence around the locations.

FIGS. 2-6 are example maps that illustrate a method of generating geofences.

Figure 2:
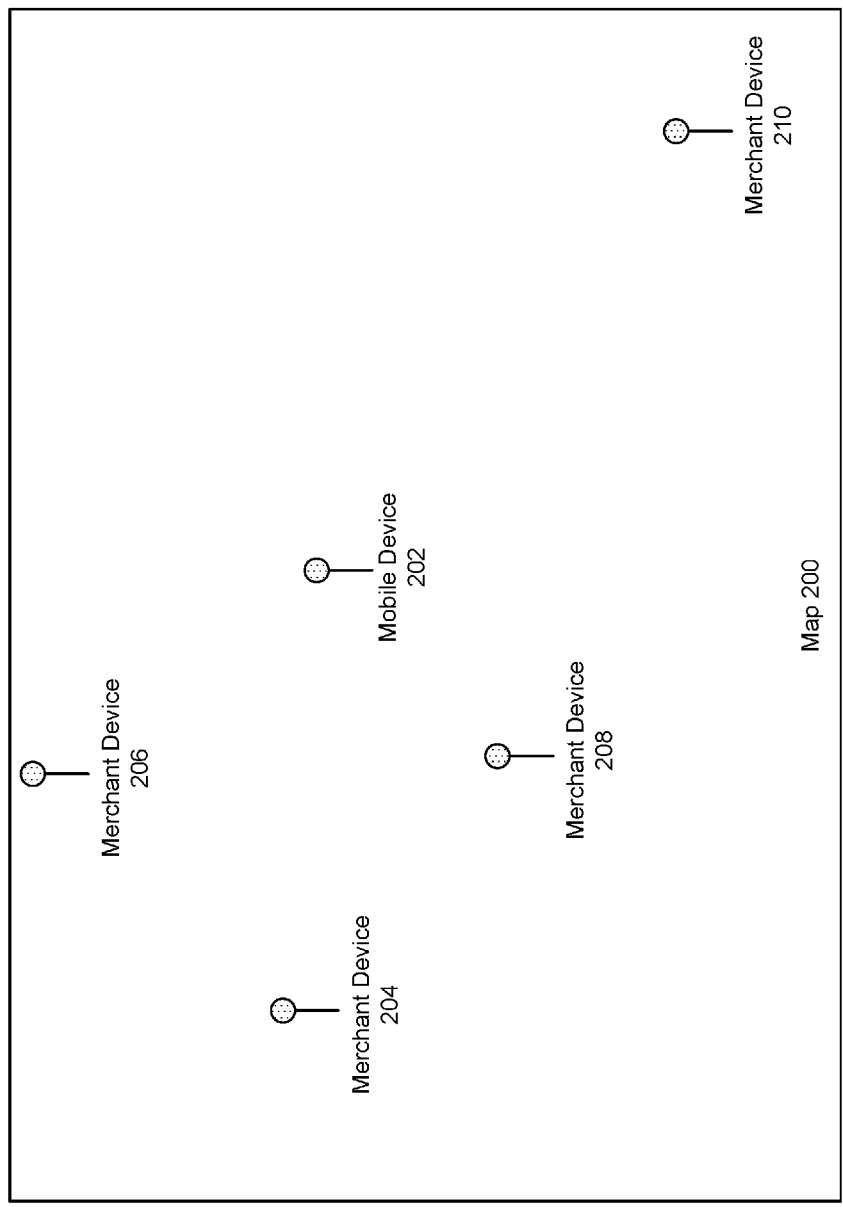
FIGS. 2-6 are example maps that illustrate a method of generating geofences.

FIG. 2 is an example map 200 that illustrates a mobile device 202 identifying locations 204, 206, 208, 210. The mobile device 202 receives nearby locations (e.g., by communicating with a location database as described above in reference to FIG. 1). In some implementations, the locations are locations of merchants. In some implementations, the mobile device 202 is limited to detecting a maximum number of concurrent geofences. For example, the maximum number can be 2, 4, 10, 20, 50, or more geofences. The mobile device 202 can identify the locations that are closest to the mobile device's current location, with a conventional Euclidean distance calculation. In some implementations, the mobile device identifies a number of nearby locations that is equivalent to the maximum number of concurrent geofences. That is, if N is the maximum number of concurrent geofences, then N closest locations are identified. For example, if the maximum number of concurrent geofences is 4 geofences, the mobile device 202 identifies the 4 closest merchant devices.

Figure 3:
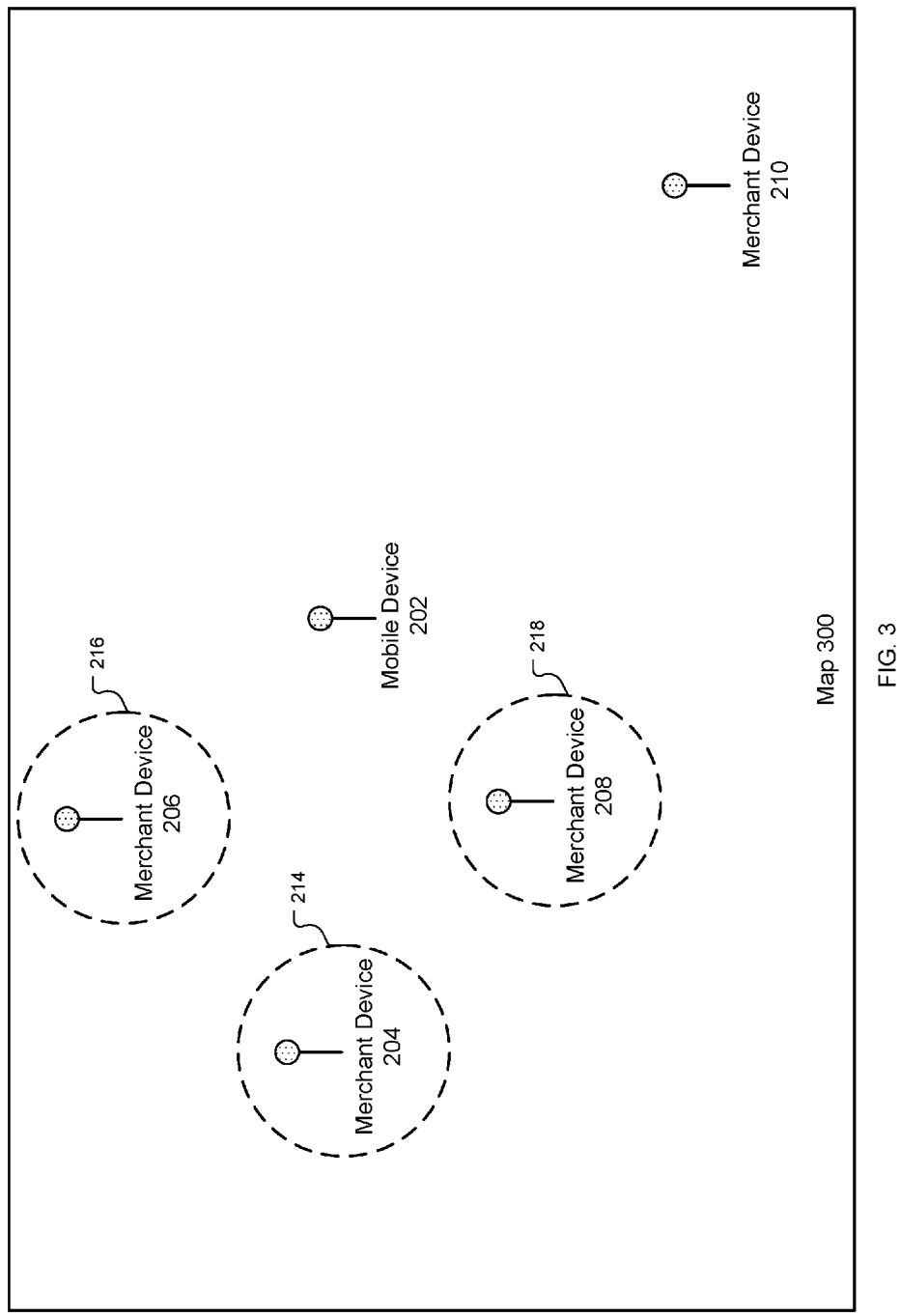

FIG. 3 is an example map 300 that illustrates the mobile device 202 generating "small" geofences, also referred to as local geofences, around the locations 204, 206, 208. The mobile device 202 generates the geofences around the locations nearest to the mobile device's location. In some implementations, the number of generated geofences is fewer than the maximum number of concurrent geofences. In some other implementations, if the mobile device 202 is limited to generating a maximum number of concurrent geofences, the mobile device 202 generates geofences numbering one less than the maximum number of concurrent geofences. That is, if N is the maximum number of concurrent geofences, then geofences are generated for the N-1 closest locations. For example, as illustrated in FIG. 3, if the limit is 4 geofences, the mobile device 202 generates 3 geofences 214, 216, 218 around the 3 nearest locations 204, 206, 208. The mobile device 202 does not generate a geofence around the fourth closest merchant device location (e.g., merchant device 210). The fourth closest location can be an outer bound location that is farther, from the mobile device's location, than the other merchant device locations that have small geofences. These geofences can have perimeters suitable for determination that the mobile device is present at or close to the location, e.g., that the mobile device is at a building or an establishment corresponding to the location. For example, the N-1 geofences can have relatively small perimeters, e.g., a radius of 100, 150, or 500 feet. The mobile device 202 can use the remaining geofence for a large geofence as described below in reference to FIG. 4.

Figure 4:
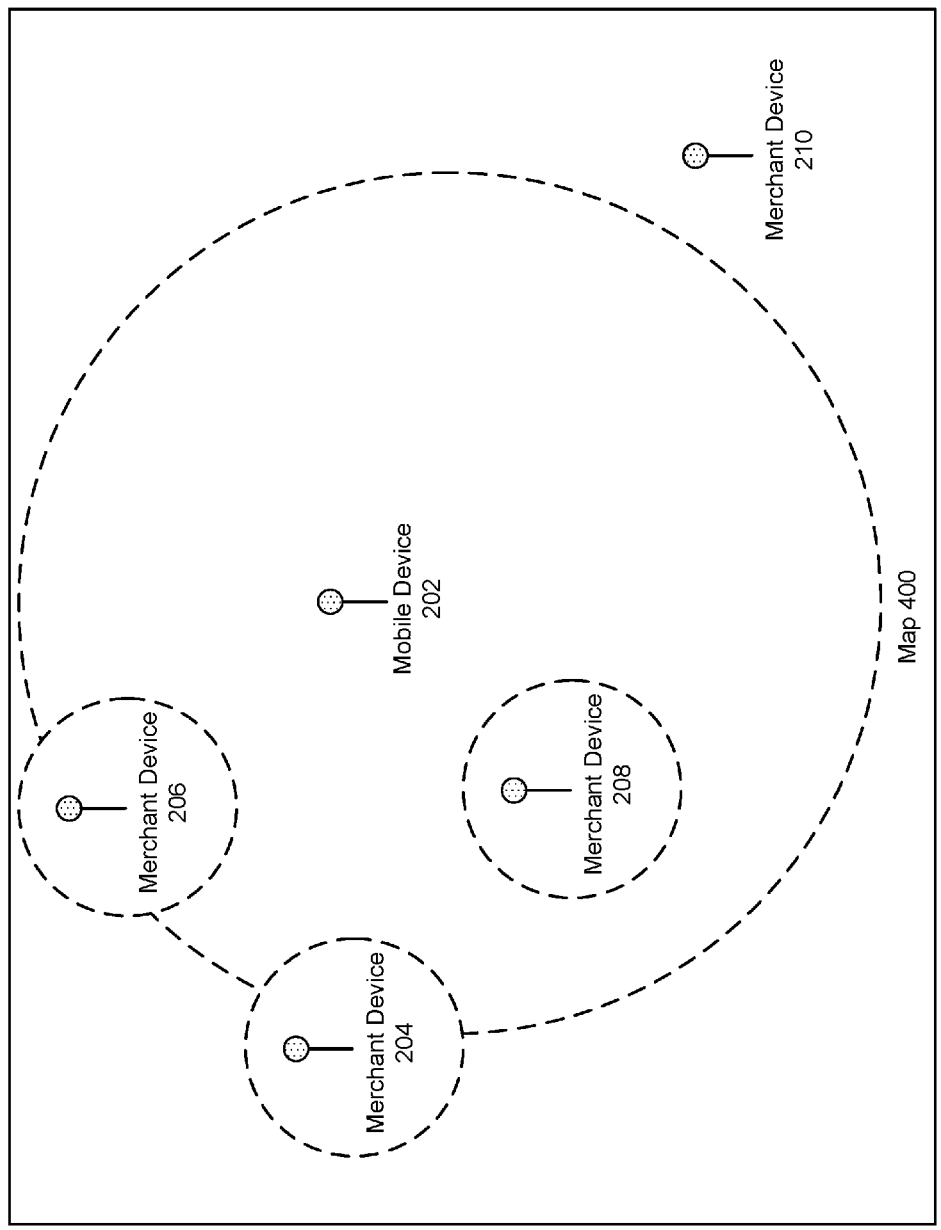

FIG. 4 is an example map 400 that illustrates a mobile device 202 generating a "large" geofence, also referred to as a triggering geofence, surrounding the mobile device 202. With a remaining geofence (e.g., the remaining geofence as described above in reference to FIG. 3), the mobile device 202 generates the geofence around the mobile device's current location and sets a relatively large radius for the geofence, relative to the size of the geofences used to detect presence near the locations 204, 206, 208. The large radius encloses up to, but does not include, the closest location that does not have a small geofence. That is, if N is the maximum number of concurrent geofences, then the perimeter of the "large" geofences is set to include the N-1 closest locations, but not include the Nth closest location. For example, as illustrated in FIG. 4, the mobile device 202 generated small geofences around locations 204, 206, and 208, but did not generate a geofence around location 210. The "large" geofence is established to include locations 204, 206, and 208 but does not include location 210. In some implementations, the radius of the large geofence is the distance between the mobile device's current location and a point on an outer bound circumference. The outer bound circumference can be a perimeter of the geofence that would be generated around the closest location that does not have a small geofence (e.g., location 210).

Figure 5:
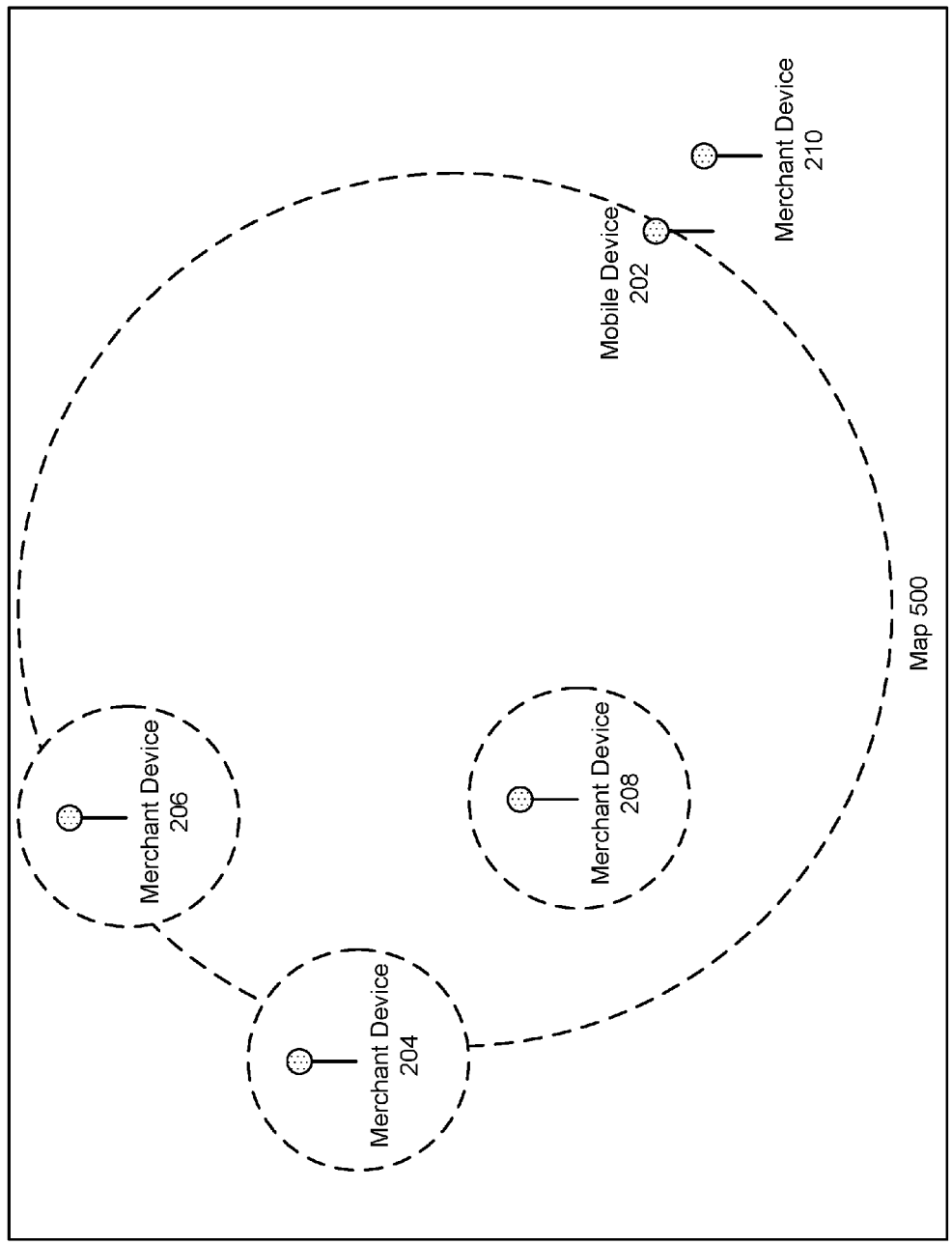

FIG. 5 is an example map 500 that illustrates a mobile device 202 exiting the large geofence. As described above in reference to FIG. 1, the mobile device 202 can detect when it exits a geofence. If the geofencing engine of the mobile device 202 detects that the mobile device 202 is located outside of the large geofence, the mobile device 202 repeats the process for generating geofences, as described above in reference to FIGS. 2-4.

Figure 6:
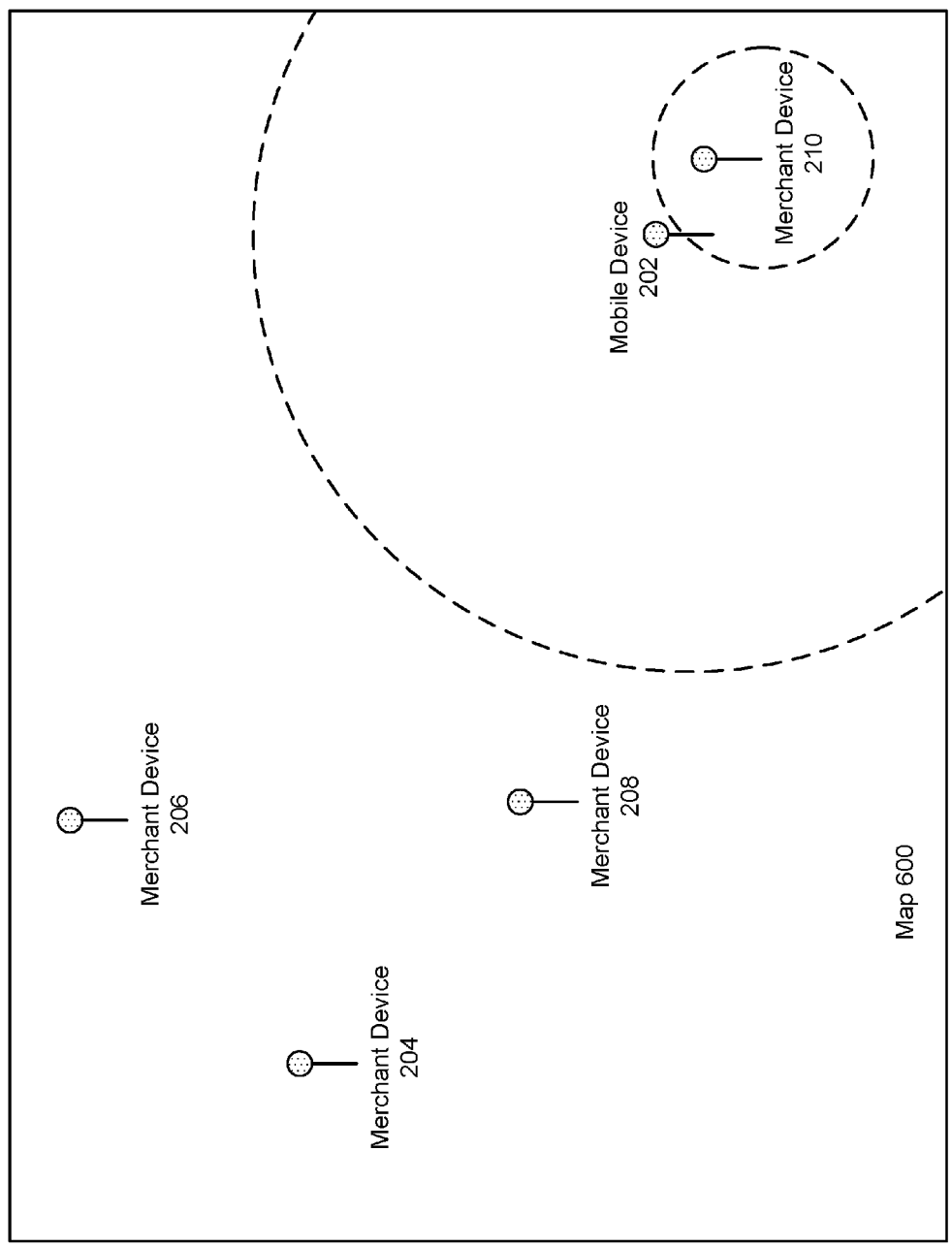

FIG. 6 is an example map 600 that illustrates a mobile device 202 repeating the process of generating geofences. The mobile device 202 performs, again, the processes described above in reference to FIGS. 2 and 4. For example, the mobile device 202 identifies merchants near the mobile device's location, generates small geofences around the merchants' locations, e.g., merchant device 210, and generates a large geofence around the mobile device's location. In some implementations, the mobile device 202 receives more nearby merchants from a location database. In alternative implementations, the mobile device 202 previously cached numerous nearby locations and identifies nearby merchants from the cache. In this way, the mobile device 202 can access an "infinite" number of geofences around merchant locations.

Although the description above focuses on geofences around locations of merchant devices, geofences can be generated around a location of any computer device, e.g., a user's smartphone or a laptop. In some implementations, geofences are generated around raw coordinates, e.g., coordinates received from a server.

Figure 7:
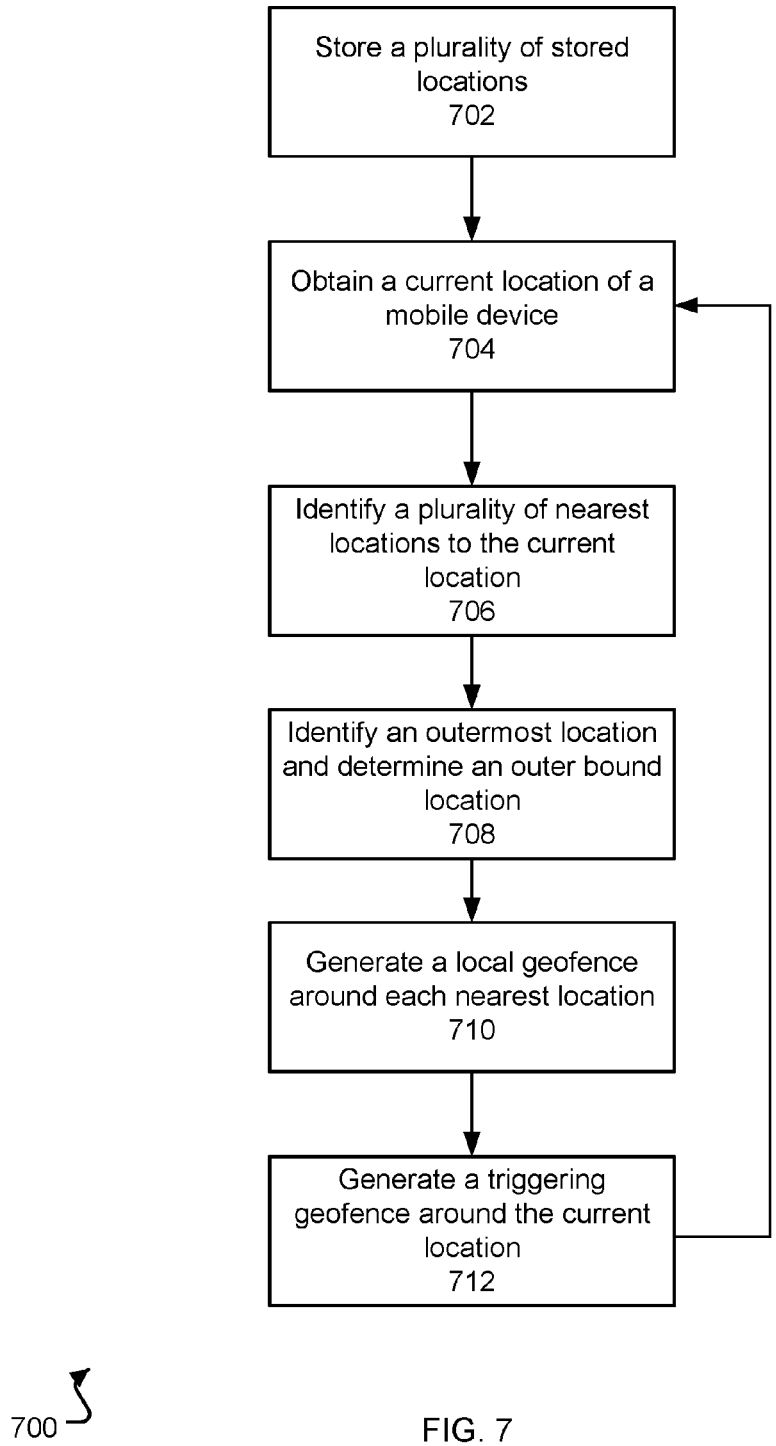
FIG. 7 is a flow chart of a method of generating geofences.

FIG. 7 is a flow chart of an example process 700 for generating geofences by a mobile device. The mobile device stores a set of locations as described above in reference to FIG. 1 (step 702). The mobile device obtains a current location of the mobile device (step 704). The mobile device identifies locations that are nearest to the current location as described above in reference to FIG. 2 (step 706). The locations can be obtained from the set of stored locations in the mobile device. The mobile device identifies an outermost location and determines an outer bound location (step 708). The outer bound location is located farther from the current location than any of the nearest locations other than the outermost location. The mobile device generates a local geofence around each nearest location (step 710) and generates a triggering geofence around the current location (step 712), which are described above in reference to FIGS. 3 and 4. Upon detecting that the mobile device has exited the triggering geofence, the mobile device then iterates steps 704-712 for a new current location around the mobile device, as described above in reference to FIGS. 5 and 6.

Figure 8A:
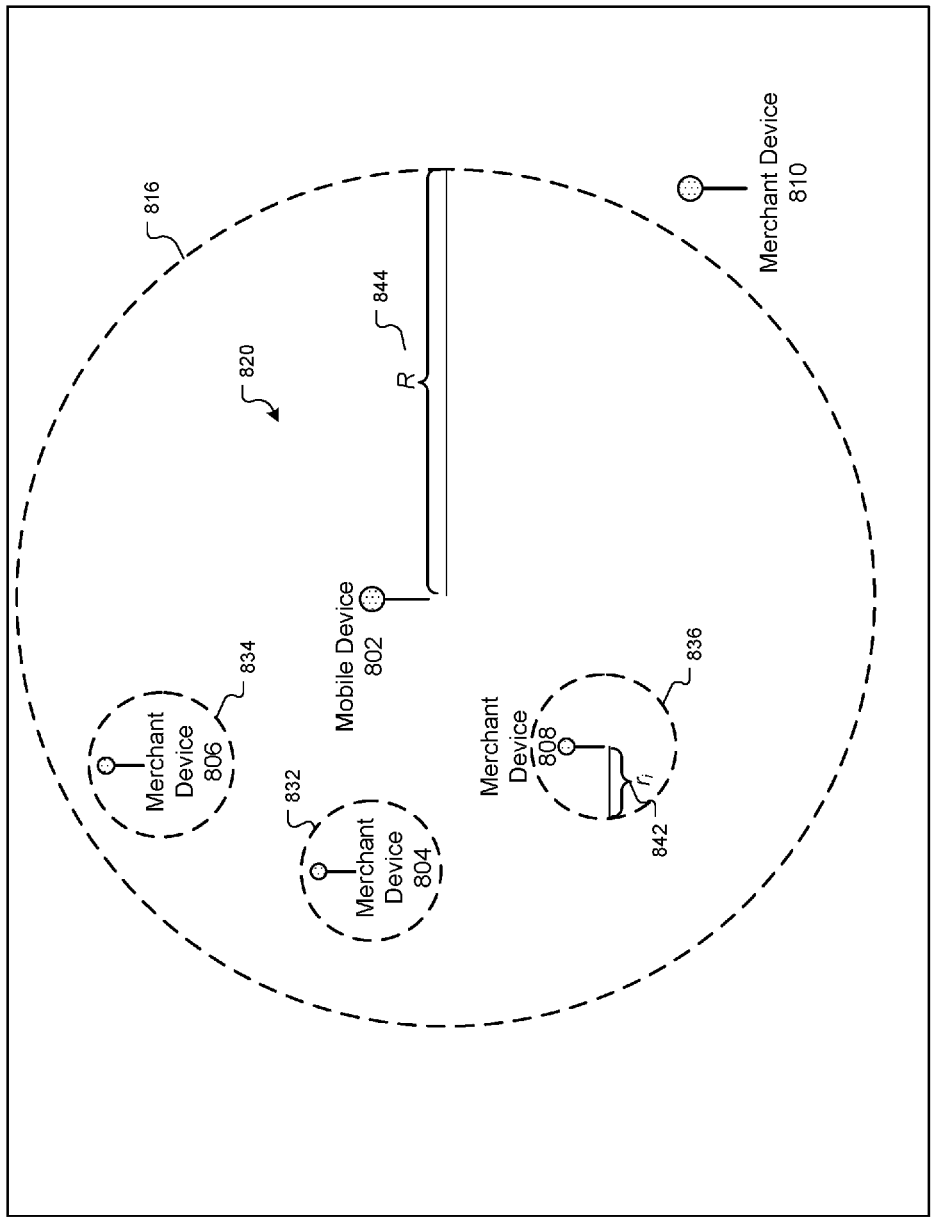
FIG. 8A illustrates geofences generated for a sparse area.

FIG. 8A illustrates geofences generated for a sparse area. In sparse areas, where merchants or other points of interest are widely distributed and have a low density, the triggering geofence may be quite large, e.g., 3000 feet. The location granularity for the location of the mobile device may degrade in sparse regions because of geolocation resolution limitations of certain geolocation technologies, e.g., GPS signals and cellular triangulation.

Mobile device 802 is near three merchant locations, the merchant locations 804, 806, and 808. Each of the merchant locations 804, 806, and 808, has a local geofence, e.g., the geofences 832, 834, and 836, each enclosing a circular region having an initial radius $r_i$ 842. Although only three locations are shown, the process is equally applicable to an arbitrary number of merchant locations.

The mobile device 802 generates a triggering geofence 816 that encloses a circular geographic region 820 having a radius R 844 and that includes the three merchant locations 804, 806, and 808, which may be based on the location of the merchant device 810. The geolocation resolution for the location of the mobile device may be poor if the triggering geofence 816 is large. In other words, the location of the mobile device 802 may not be determined as precisely as is possible for other areas due to the size of the triggering geofence 816. For example, although the mobile device 802 has determined its own location to be outside of the local geofence 836 for the merchant device 808, the mobile device 802 may actually be located within the local geofence 836. The inaccuracy in geolocation thus may prevent an appropriate notification on the mobile device. Thus, when the triggering geofence 816 is large, the mobile device can switch over to using a larger size for the local geofences.

Figure 8B:
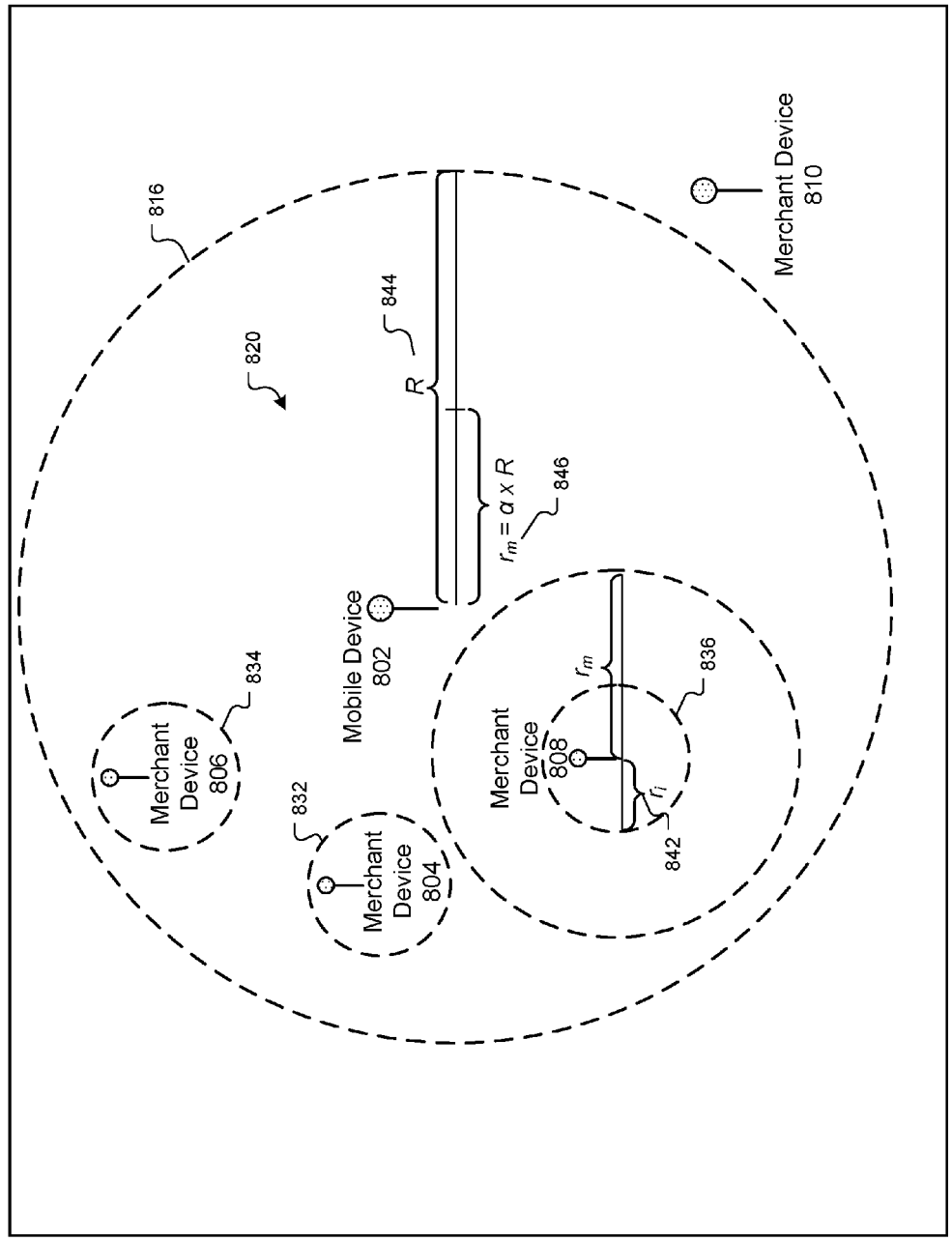
FIG. 8B illustrates generating larger local geofences for a sparse area.
Figure 9:
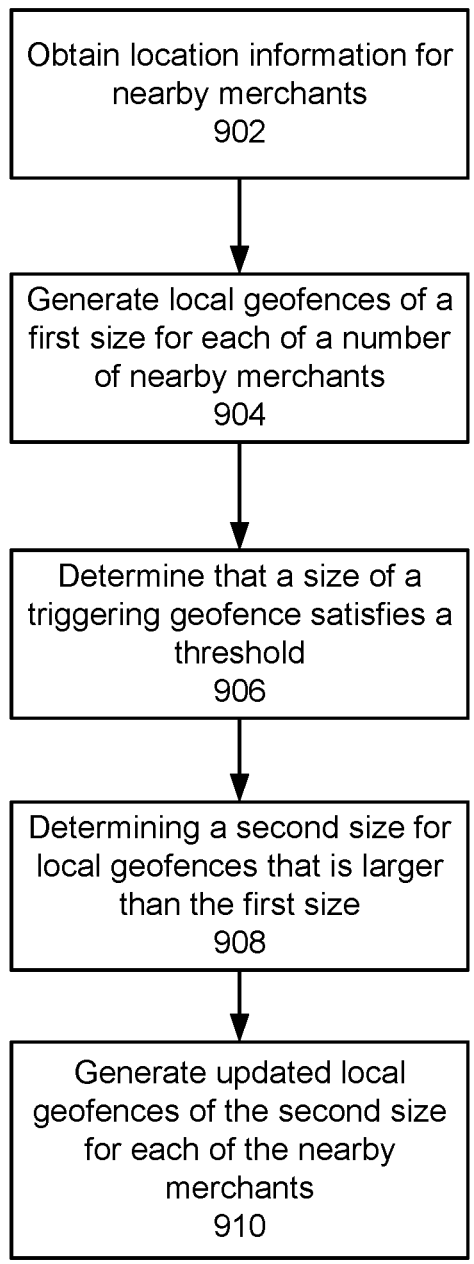
FIG. 9 is a flow chart of an example process for adjusting the size of local geofences in a sparse region.

FIG. 8B illustrates generating larger local geofences for a sparse area. In some implementations, the mobile device 802 computes a modified radius $r_m$ 846 for local geofences that is a ratio α of the radius R 844 of the triggering geofence. The modified radius $r_m$ 846 increases the size of the local geofences, increasing the likelihood that the mobile device 802 will correctly generate a notification when inside a local geofence when located near a corresponding merchant location. FIG. 9 is a flow chart of an example process for adjusting the size of local geofences in a sparse region. In general, a mobile device increases a size of local geofences when a size of a triggering geofence satisfies a size threshold. The example process can be implemented by one or more computer programs installed on one or more computers. The process will be described as being performed by a mobile device, e.g. the mobile device 802 of FIGS. 8A and 8B. The mobile device obtains location information for nearby merchants (902). For example, the mobile device can provide its own location to a server and can obtain a list of all merchants that are within a threshold distance to the location of the mobile device, e.g. all merchants located within five miles.

The mobile device generates local geofences of a first size for each of a number of the nearby merchants (904). The mobile device may generate local geofences only for a limited number of nearest merchant locations of the list of merchant locations received from the server.

The mobile device can then determine the parameters for a triggering geofence that will enclose a region that includes the number of nearest merchant locations. For example, the mobile device can define the triggering geofence as a circular region centered on the mobile device and having a particular radius. In some implementations, the radius is the distance between the mobile device and an outer merchant location that is not among the number of nearest merchant locations, e.g., the next-nearest merchant location, or, equivalently, the N+1th nearest merchant location for N nearest merchant locations. The triggering geofence can also be an elliptical or a polygonal region.

The mobile device determines that a size of the triggering geofence satisfies a threshold (906). The mobile device can use any appropriate size metric for making a determination about the size of the triggering geofence. For example, if the triggering geofence is a circular region, the mobile device can determine that the radius of the circular region satisfies a threshold. If the triggering geofence is an elliptical region, the mobile device can determine that an axis of the ellipse satisfies a threshold. The mobile device can also compute an area of the region enclosed by the triggering geofence to determine that a size of the triggering geofence satisfies a threshold.

The mobile device determines a second size for local geofences that is larger than the first size (908). If the triggering geofence is large, the mobile device can increase the size of the local geofences by modifying an appropriate size metric of the local geofences. For example, the mobile device can increase a radius, axis, or area of local geofences.

In some implementations, the mobile device determines an updated radius value that is based on a ratio of the radius of the triggering geofence. For example, the mobile device can compute a modified radius $r_m$ based on a radius R of the trigging geofence and a ratio α according to:

$$r_m = \alpha \times R.$$

The mobile device generates updated local geofences of the second size for each of the nearby merchants (910). For example, the mobile device may determine that the mobile device is located in an updated local geofence for a particular merchant location and generate an appropriate notification. Thus, the updated size for the local geofences can decrease the likelihood that poor geolocation resolution in a particular area will result in a missed geofence notification.

FIG. 10A illustrates geofences generated for a dense area. In dense areas, where merchants or other points of interest are densely distributed, the trigging geofence may be quite small, e.g. less than 100 feet. When the triggering geofence is small, the triggering geofence may not enclose a substantial portion of some of the local geofences, or the small size may result in overly frequent updates on a mobile device to the triggering geofence and the local geofences.

Mobile device 1002 is near three merchant locations, e.g., the merchant locations 1004, 1006, and 1008. Each of the merchant locations 1004, 1006, and 1008, has been assigned a local geofence, e.g., the geofences 1032, 1034, and 1036.

The mobile device generates a triggering geofence 1040 based on the next-nearest merchant location 1010. Because the area is densely populated, the next-nearest merchant location 1010 is only slightly farther away from the other merchant locations, resulting in a small triggering geofence 1040 that is not substantially larger than the local geofences 1032, 1034, and 1036.

Figure 10B:
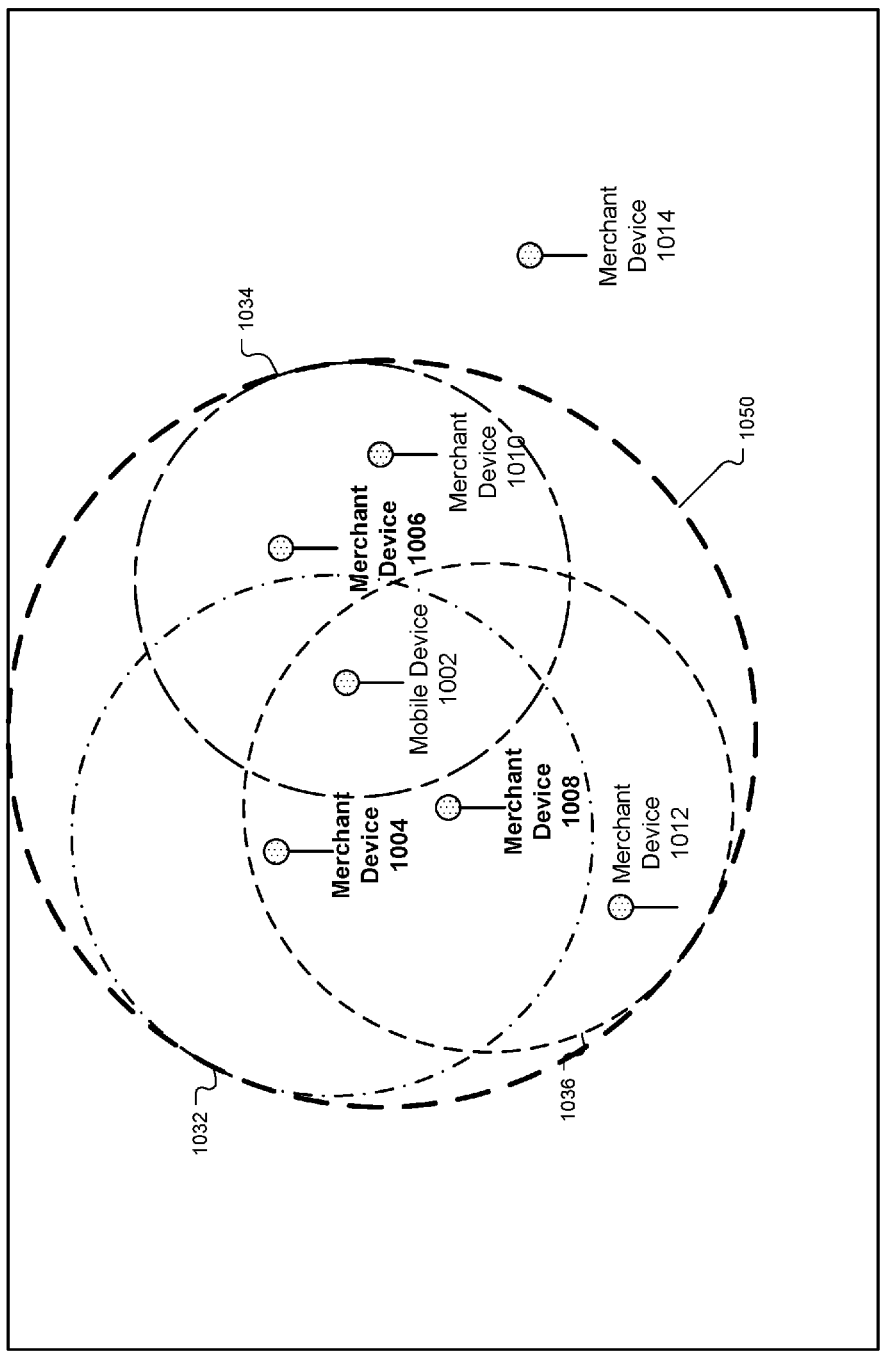
FIG. 10B illustrates a coalesced geofence.

FIG. 10B illustrates a coalesced geofence. When the triggering geofence is small, the mobile device can select two or more of the nearest merchant locations to share a common coalesced geofence. A coalesced geofence generates similar notifications as a local geofence, but the notification is applied to all of the two or merchants that share the common coalesced geofence. In some implementations, a coalesced geofence encloses a region that encompasses all of the regions enclosed by the local geofences of merchant locations that share the coalesced geofence.

For example, due to the small size of the triggering geofence 1040, the mobile device 1002 generates a coalesced geofence 1050 for the merchant locations 1004, 1006, and 1008. The coalesced geofence 1050 encloses a region that includes the regions enclosed by the local geofences 1032, 1034, and 1036. Thus, when the mobile device enters the region enclosed by the coalesced geofence 1050, the mobile device will provide a notification for all three merchants at merchant locations 1004, 1006, and 1008.

Figure 10C:
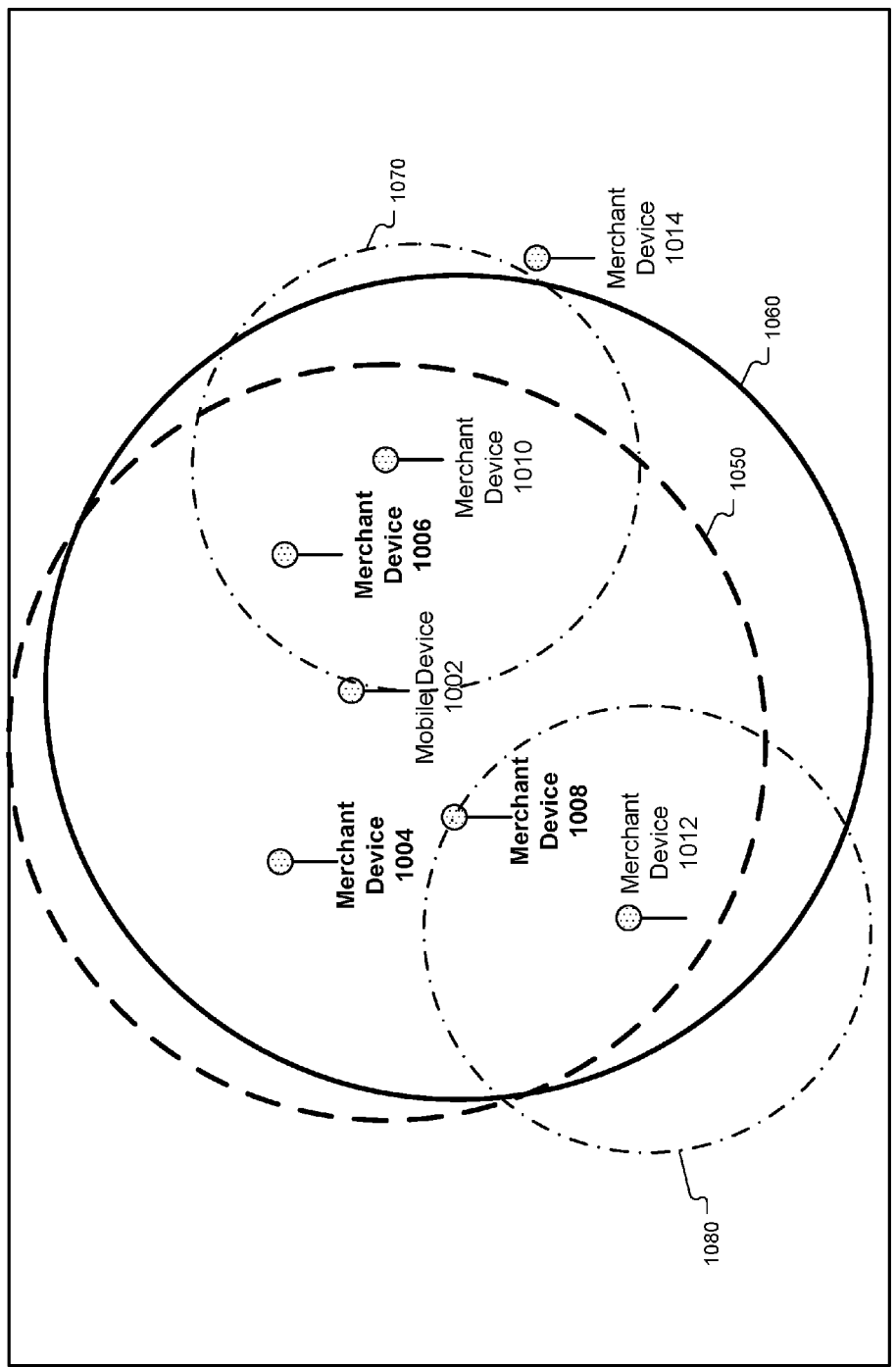
FIG. 10C illustrates generating additional local geofences after generating a coalesced geofence.

FIG. 10C illustrates generating additional local geofences after generating a coalesced geofence. Because a coalesced geofence is shared by multiple merchant locations, generating a coalesced geofence can free up resource allocation for one or more additional local geofences. For example, because the coalesced geofence 1050 is shared by three merchant locations, the mobile device 1002 can generate two additional local geofences, e.g., the local geofence 1070 for the merchant location 1010 and the local geofence 1080 for the merchant location 1012.

The additional local geofences will generally also increase the size of the triggering geofence, e.g., by increasing the distance between the mobile device and an outer merchant location that is not among a number of nearest merchant locations. For example, the mobile device 1002 can generate an updated triggering geofence 1060 that encloses a region that includes the five merchant locations 1004, 1006, 1008, 1010, and 1012, but that does not include the outer merchant location 1014.

Figure 11:
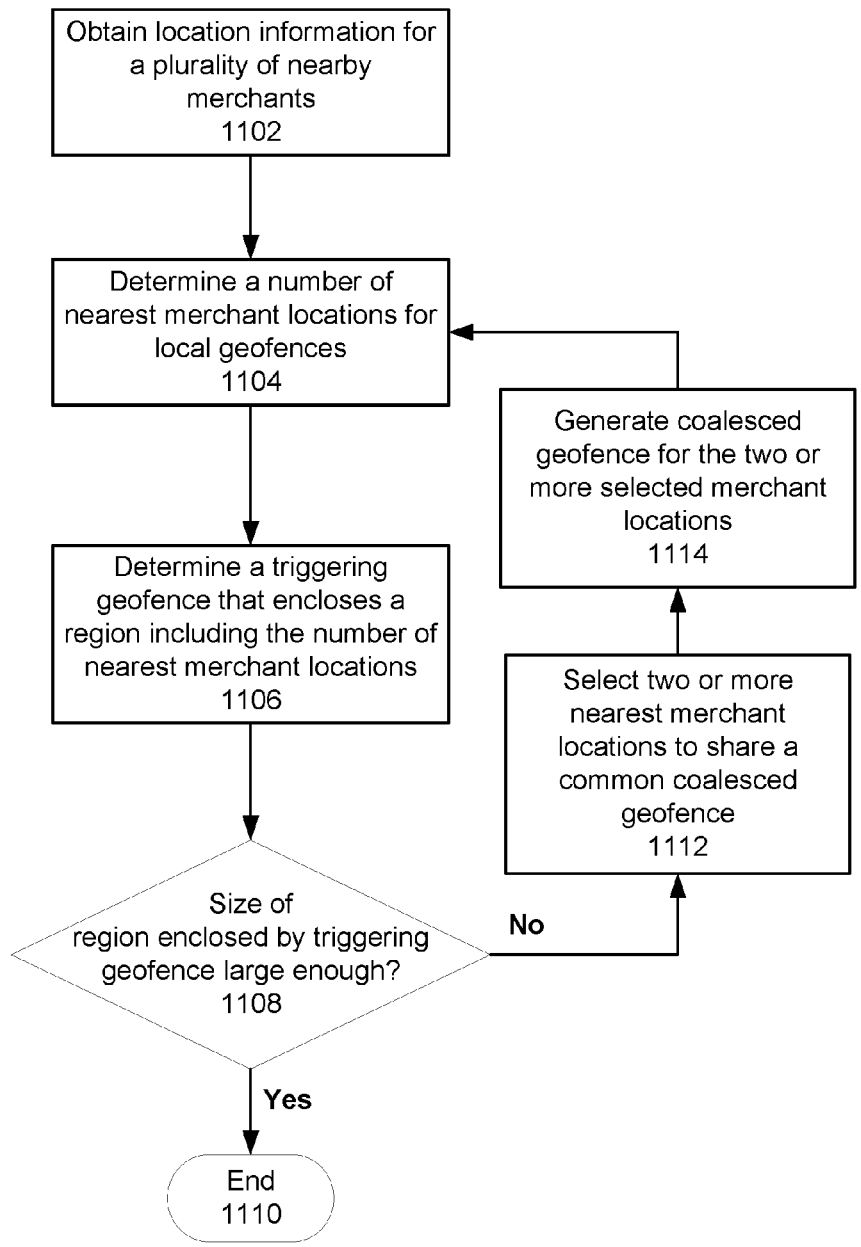
FIG. 11 is a flow chart of an example process for coalescing geofences.

FIG. 11 is a flow chart of an example process for coalescing geofences. In general, in a densely populated region a mobile device will repeatedly coalesce geofences until the triggering geofence is of a sufficiently large size. The example process can be implemented by one or more computer programs installed on one or more computers. The process will be described as being performed by a mobile device, e.g. the mobile device 1002 of FIGS. 10A-10C.

The mobile device obtains location information for a plurality of nearby merchants (1102). As described above, the mobile device can provide its own location to a server and receive a plurality of merchant locations that are within a particular distance to the location of the mobile device.

The mobile device determines a number of nearest merchant locations for local geofences (1104). For example, the mobile device may have allocated only a particular number of merchant locations for generating geofences, e.g. only 10, 20, or 50 local geofences.

The mobile device determines a triggering geofence that encloses a region including the number of nearest merchant locations (1106). For example, as described above with reference to FIG. 9, the mobile device can determine an appropriate triggering geofence, which may be based on an outer merchant location that is not among the number of nearest merchant locations.

The mobile device determines whether the size of the region enclosed by the triggering geofence is large enough (1108). For example, as described above with reference to FIG. 9, the mobile device can compute an appropriate measure of size for the triggering geofence and determine whether the size measure satisfies a threshold.

In some implementations, the mobile device compares the size of the triggering geofence to the size of the local geofences. The mobile device can compute a ratio between the size of the triggering geofence and the size of the local geofences and determine whether the ratio satisfies a threshold. For example, the mobile device can require that the triggering geofence have a radius that is at least five times the radius of the local geofences.

The mobile device can also determine whether a region enclosed by the trigging geofence is large enough based on a number of merchant locations that the region includes. In some implementations, the mobile device determines that the region enclosed by the triggering geofence is not large enough if the region includes more than a threshold number of merchant locations, e.g. more than 50 merchant locations.

If the size of the region enclosed by the triggering geofence is large enough, the process ends (branch to 1110).

If the size of the region enclosed by the triggering geofence is not large enough, the mobile device selects two or more nearest merchant locations to share a common coalesced geofence (branch to 1112). The mobile device can select two or more of the nearest merchant locations according to one or more criteria. For example, the mobile device can select the two merchant locations that are nearest to the mobile device. The mobile device can also select the two merchant locations that are nearest to each other among the number of nearest merchant locations. The mobile device can also compute a measure of overlap between regions enclosed by local geofences for two locations, e.g. a percentage of common area, and select two locations that have the greatest measure of overlap.

The mobile device generates a coalesced geofence for the two or more selected merchant locations (1114). In general, the mobile device will generate a coalesced geofence that encloses a region that includes as much of the multiple regions that would have been enclosed by individual local geofences.

In some implementations, the mobile device determines a circular region that is tangent to all the circular regions of the individual local geofences and which includes all the circular regions of the individual local geofences. The mobile device can determine the center point (x, y) and radius r of a solution circle by using an algebraic solution to the Problem of Apollonius from three circular regions defined by parameters $(x_1, y_1, r_1)$, $(x_2, y_2, r_2)$, and $(x_3, y_3, r_3)$. The solution can be obtained by solving the following simultaneous quadratic equations:

$$(x-x_1)^2+(y-y_1)^2-(r\pm r_1)^2=0,$$

$$(x-x_2)^2+(y-y_2)^2-(r\pm r_2)^2=0, \text{ and}$$

$$(x-x_3)^2+(y-y_3)^2-(r\pm r_3)^2=0.$$

After generating a region for the coalesced geofence, the mobile device associates each of the selected merchant locations with the coalesced geofence. Thus, when the mobile device enters the region enclosed by the coalesced geofence, the mobile device will generate a notification for each of the two or more merchant locations that share the common coalesced geofence.

Because multiple merchant locations are associated with a single coalesced geofence, the creation of the coalesced geofence may free up one or more allocated geofences on the mobile device. Thus, the mobile device can again select an updated number of nearest merchant locations (1104). The updated number of nearest merchant locations may include additional merchant locations that were not previously among the nearest merchant locations. The mobile device can then generate additional local geofences for the additional merchant locations. The mobile device can then repeat the steps of generating a triggering geofence based on the additional merchant locations (1106) and determining whether the size of the triggering geofence is large enough (1108). The mobile device can repeat these steps until the size of the triggering geofence is large enough, e.g., is larger than a particular threshold size.

Figure 12:
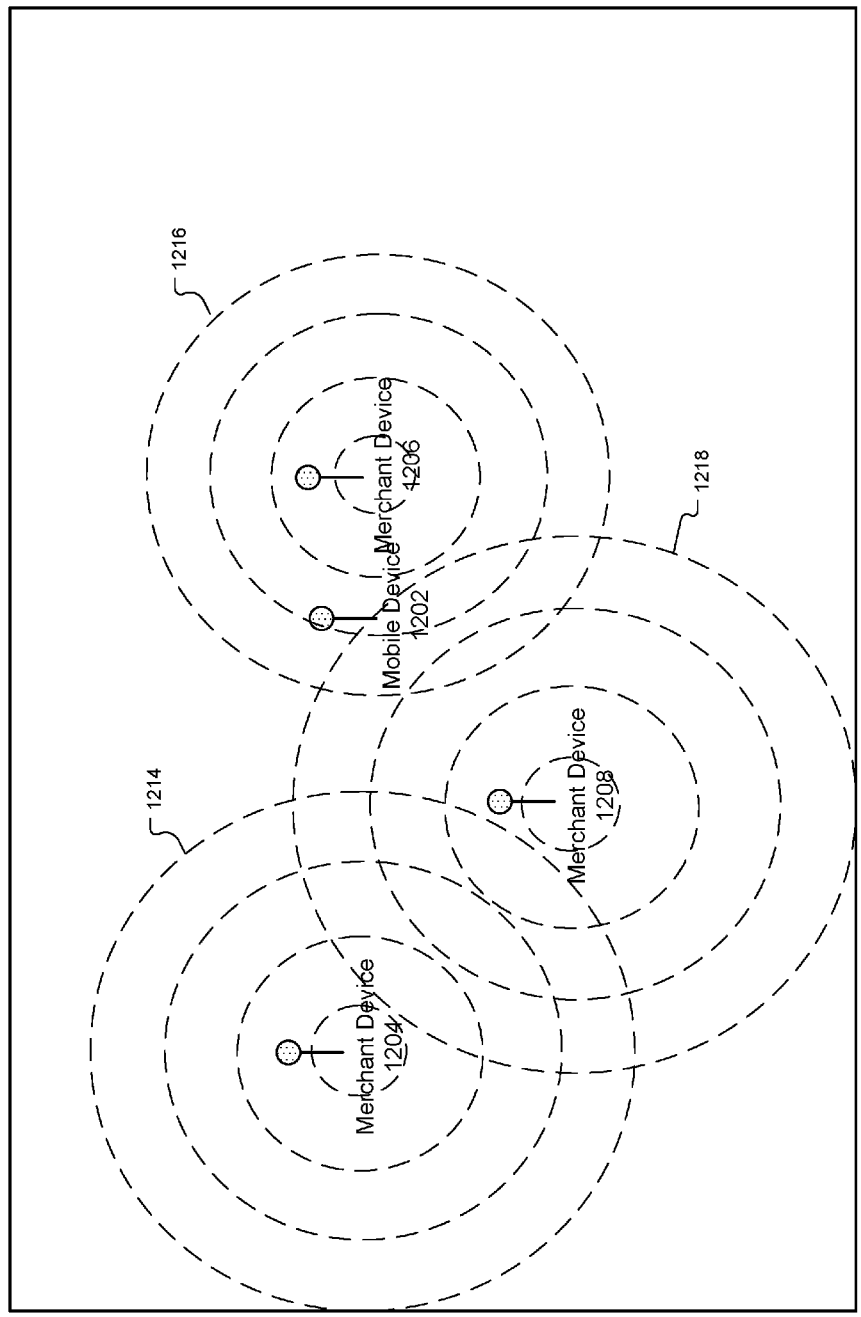
FIG. 12 illustrates geofencing using wireless beacons.

FIG. 12 illustrates geofencing using wireless beacons. In this specification, a wireless beacon refers to a personal user device that continuously or repeatedly emits mid-range to short-range radio signals that can directly communicate information wirelessly to other devices. A wireless beacon can communicate information, e.g. a user identifier, to another device without the devices engaging in a pairing process that requires user input and without requiring explicit user authorization to communicate with another device. The wireless beacon can be part of a mobile device, e.g. a mobile phone, or it can be a personal standalone device. The radio signals emitted by the wireless beacon can be part of any appropriate standard for mid-range to short-range radio communications having an operable range of at least 1 meter and up to about 50 meters, e.g. Bluetooth, Bluetooth 4.0, and Bluetooth Low Energy (BLE).

For example, a merchant can install an application on a BLE-enabled mobile phone or tablet. The application can cause the mobile phone or table to emit BLE signals at regular intervals, e.g., every two seconds. The BLE signal can encode a particular identifier of the merchant, which can be used by users nearby to identify the signal as originating from a merchant.

Mobile device 1202 is near three merchant locations, the locations 1204, 1206, and 1208. Each of the merchants at the merchant locations has a wireless beacon that emits a signal, e.g., the signals 1214, 1216, and 1218.

The mobile device 1202 is within signal range of only two of the merchant devices, e.g., the merchant devices 1206 and 1208. The mobile device 1202 can determine that is within range of the merchant devices by using a signal strength of the signal emitted by the merchant devices.

When the mobile device 1202 is within range of a merchant device, the mobile device generates a notification, e.g., to notify a user of the mobile device that the merchant associated with the merchant device is proximate to the user. The mobile device can then use the wireless signal emitted by the merchant device associated with the merchant to obtain information for the merchant, e.g. a merchant name, a merchant address or other contact information, or a geographic location of the merchant, to name a few examples.

Figure 13:
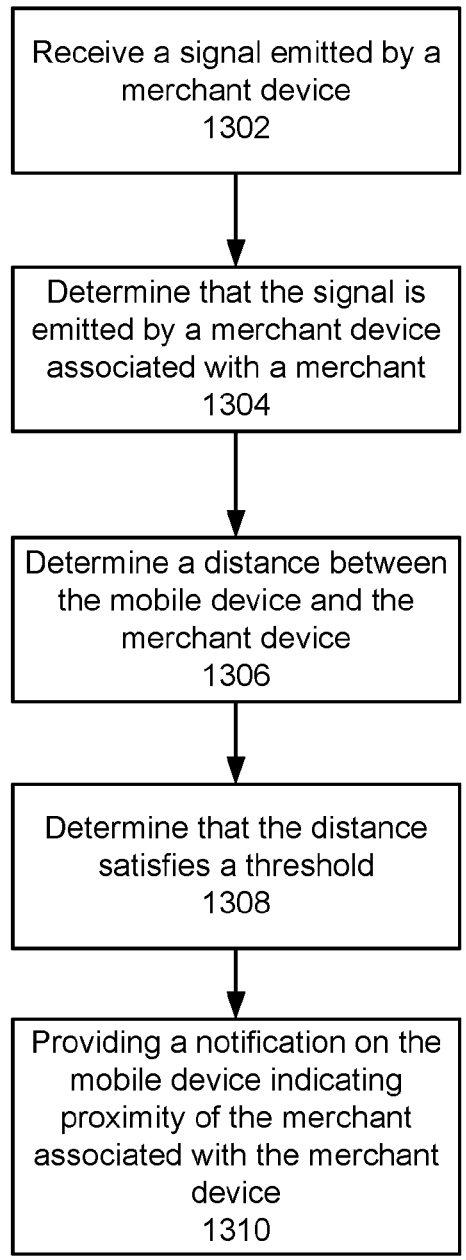
FIG. 13 is a flow chart of an example process for receiving geolocation notifications using wireless beacons.

FIG. 13 is a flow chart of an example process for receiving geolocation notifications using wireless beacons. In general, a mobile device receives a signal emitted by a merchant device and determines that it is within range of the merchant device. The mobile device can then obtain more information for the merchant from the signal emitted by the merchant or from other channels, e.g., the Internet. The mobile device can then provide a notification to signal proximity of the mobile device to the merchant location. The example process can be implemented by one or more computer programs installed on one or more computers. The process will be described as being performed by a mobile device, e.g. the mobile device 1202 of FIG. 12.

The mobile device receives a signal emitted by a merchant device (1302). From the mobile device's perspective, the receipt of a signal by itself is generally insufficient to determine that the signal is received from a merchant and not from another device emitting wireless signals.

The mobile device determines that the signal is emitted by a merchant device associated with a merchant (1304). To distinguish merchants from other devices and wireless beacons in the area that may also be emitting signals, the merchant device can encode an identifier in the signal. The mobile device can then determine that the signal is being emitted by a merchant device associated with a merchant by examining the identifier encoded in the signal.

In some implementations, the identifier is a reserved merchant identifier issued by a central authority, e.g., a payment service system with which the merchant has an account.

In some other implementations, the identifier is unique to the merchant and the mobile device can use the identifier to obtain more information in order to verify that the signal is being emitted by a merchant device. For example, the mobile device can provide the identifier to a lookup system to verify that the identifier is associated with a merchant.

To prevent fraud or impersonation of a merchant's signal, a central authority, e.g., a payment service system, can issue rotating reserved or merchant-specific identifiers to the merchants on a periodic basis. When the mobile device receives the identifier, the mobile device can communicate with the central authority to verify that the identifier is from a merchant device and that the merchant device is authenticated to be associated with the actual merchant, and not another device impersonating the merchant.

In some implementations, detection of a merchant signal and decoding of the identifier at all is an indication that the merchant device is nearby or within a threshold distance from the location of the merchant device. Thus, the mobile device may provide a notification any time that a merchant identifier is received and decoded from a signal emitted by a merchant device. However, in some other implementations, the mobile device performs an additional distance-based proximity check.

The mobile device determines a distance between the mobile device and the merchant device (1306). The mobile device can determine the distance in a number of ways. For example, the mobile device can measure the strength of the signal emitted by the merchant device, e.g., an received signal strength indicator, and convert the measure of signal strength into a distance using conventional methods.

The merchant device can also provide, to the mobile device using the emitted signal, a location of the merchant device. The mobile device can then determine its own location and use the location of the merchant device to compute a distance.

The mobile device determines that the distance satisfies a threshold (1308), and the mobile device provides a notification on the mobile device indicating proximity of the merchant associated with the merchant device (1310).

In some implementations, the distance threshold depends on a density of nearby merchants. If the density is high, the mobile device may use a smaller distance threshold to prevent notifications from too many nearby merchants. In contrast, if the density is low, the mobile device may use a larger distance threshold to increase the number of notifications of nearby merchants.

The notification can include any appropriate information received from the emitted signal from the merchant device, e.g. a merchant name, a merchant address or other contact information, a geographic location of the merchant, or directions to the merchant from the mobile device's current location, to name a few examples.

Figure 14:
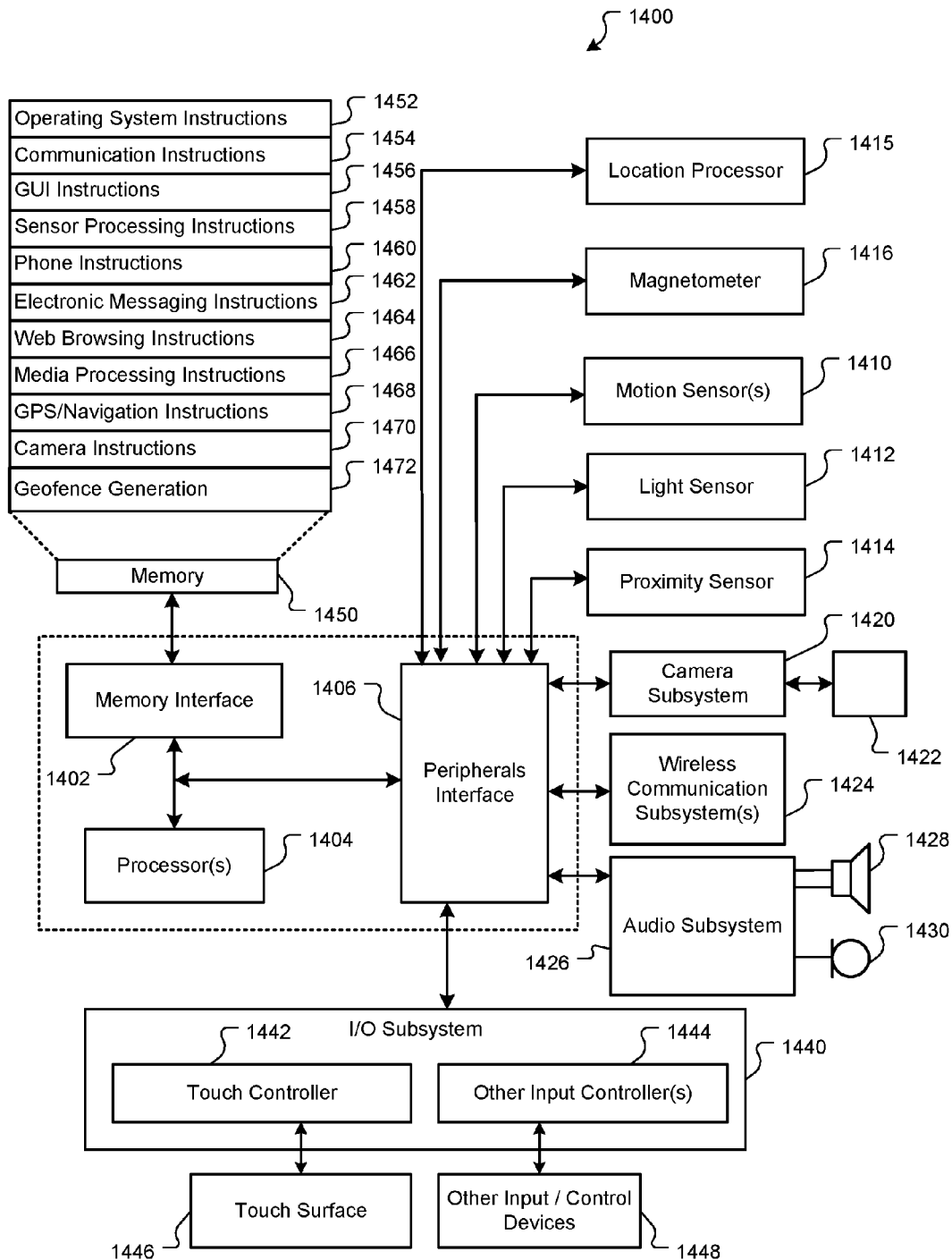
FIG. 14 is a block diagram of an exemplary architecture of a mobile device capable of generating geofences.

FIG. 14 illustrates a block diagram of an exemplary architecture of a mobile device capable of generating geofences. Architecture 1400 can be implemented in any device for generating the features described in reference to FIGS. 1-13, including but not limited to portable or desktop computers, smart phones and electronic tablets, television systems, game consoles, kiosks and the like. Architecture 1400 can include memory interface 1402, data processor(s), image processor(s) or central processing unit(s) 1404, and peripherals interface 1406. Memory interface 1402, processor(s) 1404 or peripherals interface 1406 can be separate components or can be integrated in one or more integrated circuits. The various components can be coupled by one or more communication buses or signal lines.

Sensors, devices, and subsystems can be coupled to peripherals interface 1406 to facilitate multiple functionalities. For example, motion sensor 1410, light sensor 1412, and proximity sensor 1414 can be coupled to peripherals interface 1406 to facilitate orientation, lighting, and proximity functions of the device. For example, in some implementations, light sensor 1412 can be utilized to facilitate adjusting the brightness of touch surface 1446. In some implementations, motion sensor 1410 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1406, such as a temperature sensor, a biometric sensor, or other sensing device, to facilitate related functionalities.

Location processor 1415 (e.g., GPS receiver) can be connected to peripherals interface 1406 to provide geopositioning. Electronic magnetometer 1416 (e.g., an integrated circuit chip) can also be connected to peripherals interface 1406 to provide data that can be used to determine the direction of magnetic North. Thus, electronic magnetometer 1416 can be used as an electronic compass.

Camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1424. Communication subsystem(s) 1424 can include one or more wireless communication subsystems. Wireless communication subsystems 1424 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1424 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1424 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1426 can be coupled to a speaker 1428 and one or more microphones 1430 to facilitate voice-enabled functions, such as voice recognition, voice replication, digital recording, and telephony functions.

I/O subsystem 1440 can include touch controller 1442 and/or other input controller(s) 1444. Touch controller 1442 can be coupled to a touch surface 1446. Touch surface 1446 and touch controller 1442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1446. In one implementation, touch surface 1446 can display virtual or soft buttons and a virtual keyboard, which can be used as an input/output device by the user.

Other input controller(s) 1444 can be coupled to other input/control devices 1448, such as one or more buttons, rocker switches, thumb-wheel, infrared port, USB port, and/or a pointer device such as a stylus. The one or more buttons (not shown) can include an up/down button for volume control of speaker 1428 and/or microphone 1430.

In some implementations, device 1400 can present recorded audio and/or video files, such as MP3, AAC, and MPEG files. In some implementations, device 1400 can include the functionality of an MP3 player and may include a pin connector for tethering to other devices. Other input/output and control devices can be used.

Memory interface 1402 can be coupled to memory 1450. Memory 1450 can include high-speed random access memory or non-volatile memory, such as one or more magnetic disk storage devices, one or more optical storage devices, or flash memory (e.g., NAND, NOR). Memory 1450 can store operating system 1452, such as Darwin, RTXC, LINUX, UNIX, OS X, WINDOWS, or an embedded operating system such as VxWorks. Operating system 1452 may include instructions for handling basic system services and for performing hardware dependent tasks. In some implementations, operating system 1452 can include a kernel (e.g., UNIX kernel).

Memory 1450 may also store communication instructions 1454 to facilitate communicating with one or more additional devices, one or more computers or servers. Communication instructions 1454 can also be used to select an operational mode or communication medium for use by the device, based on a geographic location (obtained by the GPS/Navigation instructions 1468) of the device. Memory 1450 may include graphical user interface instructions 1456 to facilitate graphic user interface processing; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions and display GUIs; media processing instructions 1466 to facilitate media processing-related processes and functions; GPS/Navigation instructions 1468 to facilitate GPS and navigation-related processes; camera instructions 1470 to facilitate camera-related processes and functions; and instructions 1472 for generating geofences. The memory 1450 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1450 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving an indication of a current location of a mobile device;
   obtaining information associated with a plurality of merchants that are located within a threshold distance of the current location of the mobile device;
   determining a distance threshold based at least in part on a number of the plurality of merchants;
   receiving, at the mobile device, a respective signal emitted by a corresponding merchant device associated with a corresponding merchant of the plurality of merchants;
   determining, from each respective signal emitted by the corresponding merchant device, a respective geographic location;
   determining a respective distance between the current location of the mobile device and each respective geographic location of the corresponding merchant device;
   determining that each respective distance between the mobile device and the each merchant device satisfies the distance threshold;
   determining a predetermined number of the plurality of merchants that are nearest to the current location of the mobile device;
   ranking the predetermined number of the plurality of merchants based on the respective distance between the current location of the mobile device and the respective geographical location of each of the predetermined number of the plurality of merchants, to yield a ranked list of the predetermined number of the plurality of merchants; and
   providing a notification on the mobile device indicating at least the ranked list of the predetermined number of the plurality of merchants.

2. The method of claim 1, further comprising:
   determining that each respective signal is emitted by the corresponding merchant device by, determining a code from each respective signal emitted by the corresponding merchant device; and
determining that the code corresponds to a reserved merchant identifier that identifies the corresponding merchant.

3. The method of claim 1, further comprising:
displaying, on the mobile device, a map indicating, for the plurality of merchants, the respective geographic location of the corresponding merchant device.

4. The method of claim 1, further comprising:
receiving, at the mobile device from at least one of the respective signal or an additional signal emitted by the corresponding merchant device, a unique merchant identifier for the corresponding merchant; and
requesting merchant information for the corresponding merchant from a payment service system using the unique merchant identifier.

5. The method of claim 1 wherein ranking the predetermined number of the plurality of merchants is further based on corresponding distances between respective geographical locations of the predetermined number of the plurality of merchants.

6. A mobile device comprising:
one or more processors; and
one or more non-transitory computer-readable storage devices storing instructions that, when executed by the one or more processors, cause the one or more processors to perform operations comprising:
obtaining information associated with a plurality of merchants that are located within a threshold distance of the mobile device;
determining a distance threshold based at least in part on a number of the plurality of merchants;
receiving a respective signal emitted by a corresponding merchant device associated with a corresponding merchant of the plurality of merchants;
determining a respective distance between the mobile device and each corresponding merchant device;
determining that each respective distance between the mobile device and the corresponding merchant device satisfies the distance threshold;
determining a predetermined number of the plurality of merchants that are nearest to the mobile device;
ranking the predetermined number of the plurality of merchants based on the respective distance between the mobile device and the corresponding one the predetermined number of the plurality of merchants, to yield a ranked list of the predetermined number of the plurality of merchants;
providing a notification indicating at least the ranked list of the predetermined number of the plurality of merchants.

7. The device of claim 6, wherein determining the respective distance between the mobile device and each corresponding merchant device comprises:
receiving a current location of the mobile device;
receiving, from the respective signal emitted by each corresponding merchant device, a corresponding geographic location; and
determining the distance between the current location of the mobile device and the corresponding geographic location of each corresponding merchant device.

8. The device of claim 6, wherein determining the respective distance between the mobile device and each corresponding merchant device comprises:
determining a strength of the respective signal emitted by each corresponding merchant device; and
determining the respective distance based at least in part on the strength of the respective signal.

9. The device of claim 6, further comprising:
determining that the respective signal is emitted by each corresponding merchant device by,
determining a code from the respective signal emitted by each corresponding merchant device; and
determining that the code corresponds to a reserved merchant identifier that identifies the corresponding merchant of the plurality of merchants.

10. The device of claim 6, further comprising:
a display,
and wherein the operations further comprising displaying, using the display, a map indicating a geographic location of each corresponding merchant device.

11. The device of claim 6, the operations further comprising:
receiving, from at least one of the respective signal or an additional signal emitted by each corresponding merchant device, a unique merchant identifier for the corresponding merchant of the plurality of merchants; and
requesting merchant information for the corresponding merchant of the plurality of merchants from a payment service system using the unique merchant identifier.

12. One or more non-transitory computer-readable storage devices storing instructions that, when executed by one or more processors, cause the one or more processors to perform operations comprising:
obtaining information associated with a plurality of merchants that are located within a threshold distance of the mobile device;
determining a distance threshold based at least in part on a number of the plurality of merchants;
receiving a respective signal emitted by a corresponding merchant device associated with a corresponding merchant of the plurality of merchants;
determining a respective distance between the mobile device and each corresponding merchant device;
determining that each respective distance between the mobile device and the corresponding merchant device satisfies the distance threshold;
determining a predetermined number of the plurality of merchants that are nearest to the mobile device;
ranking the predetermined number of the plurality of merchants based on the respective distance between the mobile device and the corresponding one the predetermined number of the plurality of merchants, to yield a ranked list of the predetermined number of the plurality of merchants;
providing a notification on the mobile device indicating at least the ranked list of the predetermined number of the plurality of merchants.

13. The one or more non-transitory computer-readable storage devices of claim 12, wherein determining the respective distance between the mobile device and each corresponding merchant device comprises:
receiving a current location of the mobile device;
receiving, from the respective signal emitted by each corresponding merchant device, a corresponding geographic location; and
determining the distance between the current location of the mobile device and the corresponding geographic location of each corresponding merchant device.

14. The one or more non-transitory computer-readable storage devices of claim 12, further comprising:

determining that the respective signal is emitted by each corresponding merchant device by,
  determining a code from the respective signal emitted by each corresponding merchant device; and
  determining that the code corresponds to a reserved merchant identifier that identifies the corresponding merchant of the plurality of merchants.

15. The one or more non-transitory computer-readable storage devices of claim 12, the operations further comprising displaying, on the mobile device, a map indicating a geographic location of each corresponding merchant device.

16. The one or more non-transitory computer-readable storage devices of claim 12, the operations further comprising:
  receiving, from at least one of the respective signal or an additional signal emitted by each corresponding merchant device, a unique merchant identifier for the corresponding merchant of the plurality of merchants; and
  requesting merchant information for the corresponding merchant of the plurality of merchants from a payment service system using the unique merchant identifier.

17. The method of claim 1, wherein the plurality of merchants includes at least a first merchant, a second merchant, and a third merchant, and wherein the method further comprises:
  determining that a first merchant location of the first merchant and a second merchant location of the second merchant are nearer to the currently location of the mobile device than a third merchant location of the third merchant,
  wherein determining the distance threshold is further based on ensuring that the distance threshold encloses a geographic region that includes the first geographic location and the second geographic location without including the third geographic location.

18. The mobile device of claim 6, wherein the plurality of merchants includes at least the first merchant and a second merchant, and a third merchant, and wherein the operations further comprises:
  determining that a first merchant location of the first merchant and a second merchant location of the second merchant are nearer to the currently location of the mobile device than a third merchant location of the third merchant,
  wherein determining the distance threshold is further based on ensuring that the distance threshold enclosing a geographic region that includes the first geographic location and the second geographic location without including the third geographic location.

* * * * *